United States Patent
Smyers

(10) Patent No.: US 6,191,822 B1
(45) Date of Patent: Feb. 20, 2001

(54) METHOD OF AND APPARATUS FOR SEPARATING AUDIO AND VIDEO DATA FROM A COMBINED AUDIO/VIDEO STREAM OF DATA

(75) Inventor: Scott D. Smyers, San Jose, CA (US)

(73) Assignees: Sony Corporation, Tokyo (JP); Sony Electronics, Inc., Park Ridge, NJ (US)

(*) Notice: Under 35 U.S.C. 154(b), the term of this patent shall be extended for 0 days.

(21) Appl. No.: 08/879,866

(22) Filed: Jun. 20, 1997

(51) Int. Cl.$^7$ .................. H04N 5/62; H04N 5/91
(52) U.S. Cl. ............. 348/552; 348/484; 348/483; 348/423; 348/553; 386/109; 386/98
(58) Field of Search ..................... 348/484, 738, 348/482, 483, 423, 552, 843, 845.1, 845.2, 845.3, 722, 553, 725, 13; 386/75, 98, 109

(56) References Cited

U.S. PATENT DOCUMENTS

| | | | |
|---|---|---|---|
| 4,907,079 | * 3/1990 | Turner et al. | 358/84 |
| 4,964,162 | * 10/1990 | McAdam et al. | 358/148 |
| 5,054,022 | 10/1991 | van Steenbrugge | 370/85.6 |
| 5,122,875 | * 6/1992 | Raychaudhuri et al. | 358/133 |
| 5,262,965 | 11/1993 | Putnam et al. | 395/101 |
| 5,351,090 | * 9/1994 | Nakamura | 348/484 |
| 5,396,497 | * 3/1995 | Veltman | 348/423 |
| 5,420,573 | 5/1995 | Tanaka et al. | 340/825.24 |
| 5,436,618 | 7/1995 | Van Steenbrugge | 340/825.25 |
| 5,444,709 | 8/1995 | Riddle | 370/94.1 |
| 5,473,385 | * 12/1995 | Leske | 348/500 |
| 5,537,157 | * 7/1996 | Washino et al. | 348/722 |
| 5,541,982 | 7/1996 | Bergler | 379/93 |
| 5,548,346 | * 8/1996 | Mimura et al. | 348/484 |
| 5,556,107 | 9/1996 | Carter | 463/35 |
| 5,558,339 | 9/1996 | Perlman | 463/42 |
| 5,561,670 | 10/1996 | Hoffert et al. | 370/94.1 |
| 5,576,980 | 11/1996 | Whetsel | 364/579 |

(List continued on next page.)

FOREIGN PATENT DOCUMENTS 0 696 853 A2  2/1996 (EP) ............... H04B/1/20

OTHER PUBLICATIONS

IEEE Standard, "1394 Standard for a High Performance Serial Bus," draft 8.0v2, Jul. 7, 1995.

G. Hoffman and D. Moore, "IEEE 1394: A Ubiquitous Bus," Skipstone, Inc., pp. 334–338, Mar. 5, 1995.

R. H. J. Bloks, "The IEEE–1394 High Speed Serial Bus," Phillips Journal of Research, vol. 50, No. 1/2, pp. 209–216, Jul. 1996.

"A Bus on a Diet—The Serial Bus Alternative, An Introduction to the P1394 High Performance Serial Bus," Michael Teener, IEEE, 1992, pp. 316–321.

*Primary Examiner*—John K. Peng
*Assistant Examiner*—Jean W. Désir
(74) *Attorney, Agent, or Firm*—Haverstock & Owens LLP

(57) ABSTRACT

A separator circuit receives a stream of data including both audio and video components. The separator circuit separates the audio and video components for transmission to appropriate devices. In the preferred embodiment, the separator circuit is part of a decompression engine which decompresses the received stream of data and also separates the audio and video components. Preferably, the decompression engine is implemented within a device configured for coupling to an IEEE 1394-1995 serial bus network. Alternatively, the decompression engine is implemented as a separate dedicated device within the IEEE 1394-1995 serial bus network. After separating the audio and video components, one or both of those components are transmitted from the decompression engine over one or more isochronous channels on the IEEE 1394-1995 serial bus, to the appropriate devices. When the decompression engine is implemented within a device, an appropriate one of the audio or video components is sent to circuits within the device while the other component is transmitted over the IEEE 1394-1995 serial bus.

15 Claims, 5 Drawing Sheets

U.S. PATENT DOCUMENTS

| | | | |
|---|---|---|---|
| 5,579,486 | 11/1996 | Oprescu et al. | 395/200.15 |
| 5,586,257 | 12/1996 | Perlman | 463/42 |
| 5,598,352 * | 1/1997 | Rosenau et al. | 348/423 |
| 5,598,415 | 1/1997 | Nuber et al. | 370/474 |
| 5,617,331 * | 4/1997 | Wakai et al. | 348/8 |
| 5,640,392 | 6/1997 | Hayashi | 370/395 |
| 5,655,138 | 8/1997 | Kikinis | 395/808 |
| 5,657,246 * | 8/1997 | Hogan et al. | 348/13 |
| 5,668,601 * | 9/1997 | Okada et al. | 348/423 |
| 5,675,139 * | 10/1997 | Fama | 235/472 |
| 5,675,388 * | 10/1997 | Cooper | 348/484 |
| 5,684,804 * | 11/1997 | Baronetti et al. | 348/423 |
| 5,691,768 * | 11/1997 | Civanlar et al. | 348/423 |
| 5,692,211 | 11/1997 | Gulick et al. | 395/800 |
| 5,726,989 * | 3/1998 | Dokic | 348/423 |
| 5,736,944 | 4/1998 | Kurihara | 341/50 |
| 5,742,361 * | 4/1998 | Nakase et al. | 348/423 |
| 5,758,177 | 5/1998 | Gulick et al. | 395/800.01 |
| 5,761,437 * | 6/1998 | Takano et al. | 348/423 |
| 5,761,537 | 6/1998 | Sturges et al. | 395/892 |
| 5,771,075 * | 6/1998 | Rim et al. | 348/845.3 |
| 5,781,599 | 7/1998 | Shiga | 375/376 |
| 5,787,259 | 7/1998 | Haroun et al. | 395/200.83 |
| 5,793,366 * | 8/1998 | Mano et al. | 345/329 |
| 5,802,059 | 9/1998 | Hayashi | 370/429 |
| 5,860,060 | 1/1999 | Li et al. | 704/500 |
| 5,875,349 * | 2/1999 | Cornaby et al. | 395/825 |
| 5,883,621 * | 3/1999 | Iwamura | 345/327 |
| 5,899,578 * | 5/1999 | Yanagihara et al. | 386/75 |

* cited by examiner

METHOD OF AND APPARATUS FOR SEPARATING AUDIO AND VIDEO DATA FROM A COMBINED AUDIO/VIDEO STREAM OF DATA

FIELD OF THE INVENTION

The present invention relates to the field of displaying a video stream of data while simultaneously playing an accompanying audio stream of data. More particularly, the present invention relates to the field of receiving a combined stream of data including both audio and video components and separating the audio and video components.

BACKGROUND OF THE INVENTION

The IEEE standard, "IEEE 1394 Standard For A High Performance Serial Bus," Draft ratified in 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394-1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed, the bus will then automatically reconfigure itself for transmitting data between the then existing nodes. A node is considered a logical entity with a unique address on the bus structure. Each node provides an identification ROM, a standardized set of control registers and its own address space.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-1995 cable. The physical layer 16 also provides arbitration to ensure that all devices coupled to the IEEE 1394-1995 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

Televisions used in consumer electronics systems typically have limited sound capability. Instead, high quality audio capability is achieved within typical home consumer electronics systems or configurations by connecting a separate audio amplifier component to the television. This audio amplifier will then amplify audio from a television or other video receiving device such as a video cassette recorder (VCR), and send the amplified audio signal to an attached set of speakers.

Corresponding audio and video streams of data are combined into MPEG compressed streams of data for transmission between devices. Audio/video streams of data are also stored in an MPEG compressed format in order to reduce the amount of storage space required for the stream of data. A decompression engine is required in order to decompress an MPEG compressed stream of data at the receiving component. Accordingly, in a consumer electronics system as described above, each component receiving the MPEG data stream must include an MPEG decompression engine. Both the television and the audio amplifier would need to include an MPEG decompression engine in order to separately decompress the video and audio components of the MPEG data stream.

A consumer entertainment system including a settop box, a satellite dish, a television and an audio amplifier is illustrated in FIG. 2. The settop box 22 is coupled to receive an MPEG stream of data from the satellite dish 30. The settop box 22 includes an MPEG decompression engine to decompress the MPEG stream of data. The settop box 22 is coupled to the television 20 to separately provide the television 20 with the video component from the MPEG stream of data through an analog video interface. The settop box 22 is also coupled to the audio amplifier 24 to separately provide the audio amplifier 24 with the audio component from the MPEG stream of data through an analog audio interface. The audio amplifier 24 is coupled to the speakers 26 and 28 for providing the amplified audio signal to be played on the speakers.

The settop box 22 decompresses an MPEG stream of data received from the satellite dish 30 and separates the audio and video components. The audio and video components are then transmitted from the settop box 22 to the television 20 and the audio amplifier 24, respectively, in order that the video is displayed on the television 20 while the corresponding audio is played from the speakers 26 and 28. The audio and video components are transmitted from the settop box 22 through separate analog interfaces to the appropriate components.

In the configuration illustrated in FIG. 2, only the settop box 22 is required to include an MPEG decompression engine. This decompression engine within the settop box 22 is used to decompress both the audio and video components within the MPEG stream of data. The settop box 22 includes separate analog interfaces for transmitting the audio data to the audio amplifier 24 and the video data to the television 20.

What is needed is a system which includes a single decompression engine for decompressing an MPEG stream of data and a single interface through which the audio component and the video component can be transmitted.

SUMMARY OF THE INVENTION

A separator circuit receives a stream of data including both audio and video components. The separator circuit separates the audio and video components for transmission to appropriate devices. In the preferred embodiment, the separator circuit is part of a decompression engine which decompresses the received stream of data and also separates the audio and video components. Preferably, the decompression engine is implemented within a device configured for coupling to an IEEE 1394-1995 serial bus network. Alternatively, the decompression engine is implemented as a separate dedicated device within the IEEE 1394-1995 serial bus network. After separating the audio and video components, one or both of those components are transmitted from the decompression engine over an isochronous channel on the IEEE 1394-1995 serial bus, to the appropriate devices. When the decompression engine is implemented within a device, an appropriate one of the audio or video components is sent to circuits within the device while the other component is transmitted over the IEEE 1394-1995 serial bus.

DETAILED DESCRIPTION OF THE PREFERRED EMBODIMENT

A decompression engine according to the present invention decompresses a stream of data such as an MPEG stream of data including both audio and video data. The decompression engine also separates the audio and video components from the stream of data. Preferably, the decompression engine is included within a device coupled within an IEEE 1394-1995 serial bus network with other audio and video devices. Alternatively, the decompression engine is implemented within a separate component coupled within the IEEE 1394-1995 serial bus network. Depending on the configuration and components included within the network, the decompression engine will decompress both the video and audio components of the MPEG stream of data and transmit either or both components isochronously over the IEEE 1394-1995 serial bus to the appropriate devices for output. A device according to the present invention includes a single interface through which both the decompressed audio and video components of the MPEG stream of data are transmitted. When the decompression engine is implemented within a device, an appropriate one of the audio or video components is sent to circuits within the device while the other component is transmitted over the IEEE 1394-1995 serial bus.

Figure 3:
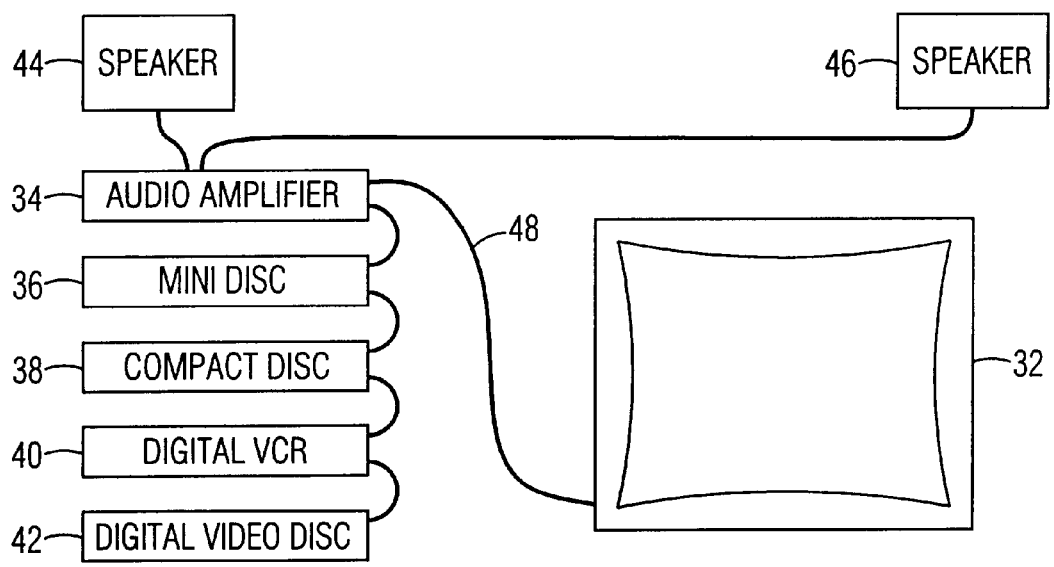
FIG. 3 illustrates a consumer entertainment system including a television having a decompression engine according to the present invention.

An exemplary consumer electronics system coupled together within an IEEE 1394-1995 serial bus network is illustrated in FIG. 3. A television 32 is coupled to an audio amplifier 34, a mini disc player and recorder 36, a compact disk player 38, a digital VCR 40 and a digital video disk player 42, through an IEEE 1394-1995 serial bus network 48. The audio amplifier 34 is also coupled to a pair of speakers 44 and 46 through a conventional analog interface. It will be recognized that such a system can include more components or a subset of these components in varying collections and still operate according to the present invention.

Figure 4:
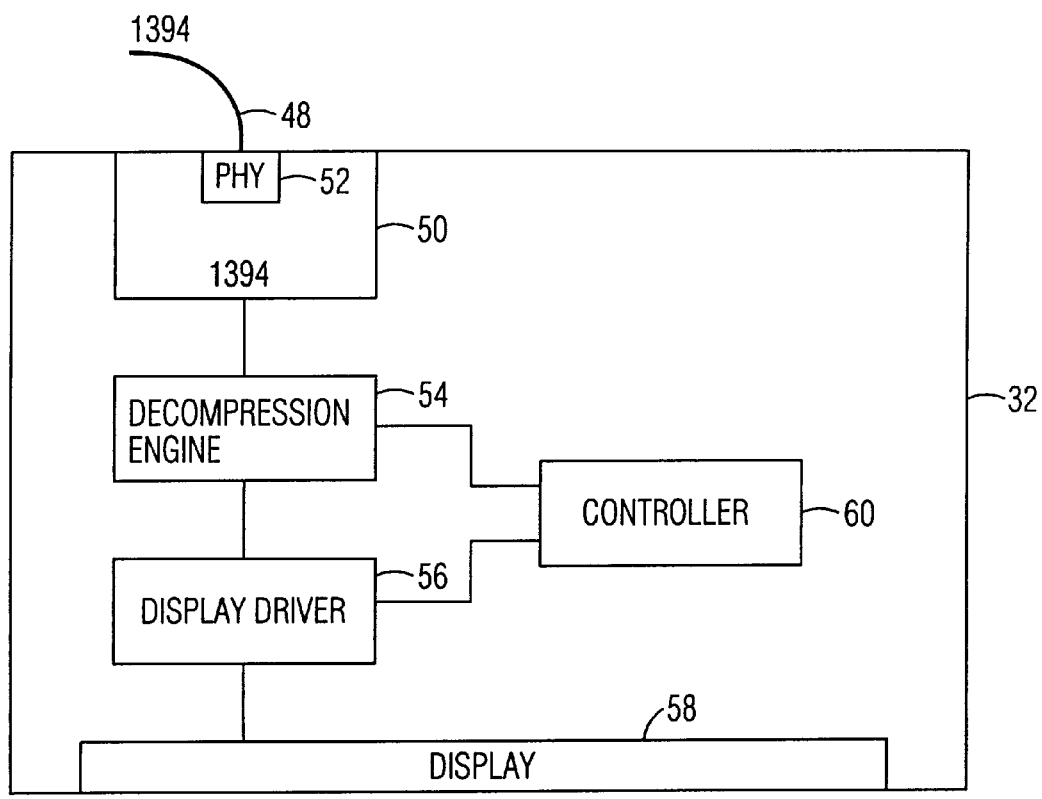
FIG. 4 illustrates a block diagram schematic of the relevant components within the television having a decompression engine, illustrated in FIG. 3.

A block diagram of the relevant components within the television 32 is illustrated in FIG. 4. An IEEE 1394-1995 interface circuit 50 includes a physical interface circuit 52 coupled to the IEEE 1394-1995 serial bus 48. Within the television 32, the IEEE 1394-1995 interface circuit 50 is coupled to a decompression engine 54 for decompressing streams of data. The decompression engine 54 is coupled to a controller 60 and to a display driver 56. The controller 60 is also coupled to the display driver 56. The display driver 56 is coupled to a display 58 for controlling the information that is displayed on the display 58.

As an example of the operation of the decompression engine 54 within the television 32, when a disk is played from the digital video disk player 42 (FIG. 3) for viewing on the television 32, a compressed MPEG stream of data is transmitted from the digital video disk player 42 to the television 32, over an isochronous channel on the IEEE 1394-1995 serial bus 48. This MPEG stream of data includes both video and audio information. Under control of the controller 60, the decompression engine 54, within the television 32, receives the MPEG stream of data from the IEEE 1394-1995 interface circuit 50, decompresses the MPEG stream of data and separates the audio and video components. The decompression engine 54 then sends the video component to the display driver 56 in order to display the video information on the display 58. The decompression engine 54 also sends the audio component to the IEEE 1394-1995 interface circuit 50 for transmission over the IEEE 1394-1995 serial bus 48 to the audio amplifier 34. The audio component is transmitted from the IEEE 1394-1995 interface circuit 50 to the audio amplifier 34 over an isochronous channel. This isochronous channel is different than the isochronous channel over which the MPEG stream of data is transmitted from the digital video disk player 42 to the television 32. When received by the audio amplifier 34, the audio information is then amplified by the audio amplifier 34 and transmitted to the speakers 44 and 46.

The audio component is transmitted from the television 32 to the audio amplifier 34 over an isochronous channel of the IEEE 1394-1995 serial bus 48. Accordingly, the audio amplifier 34 will play each portion of the audio component within its respective time frame. The decompression engine 54 and the controller 60 must ensure that the video information corresponding to the audio information is played within the same time frame in order to simultaneously provide the appropriate video and audio information.

In this same example, the separate audio information can also be sent to the mini disc player and recorder 36 for recording. The same isochronous channel can be established to transmit the separate audio information from the television 32 to both the audio amplifier 34 and the mini disc player and recorder 36.

Figure 5:
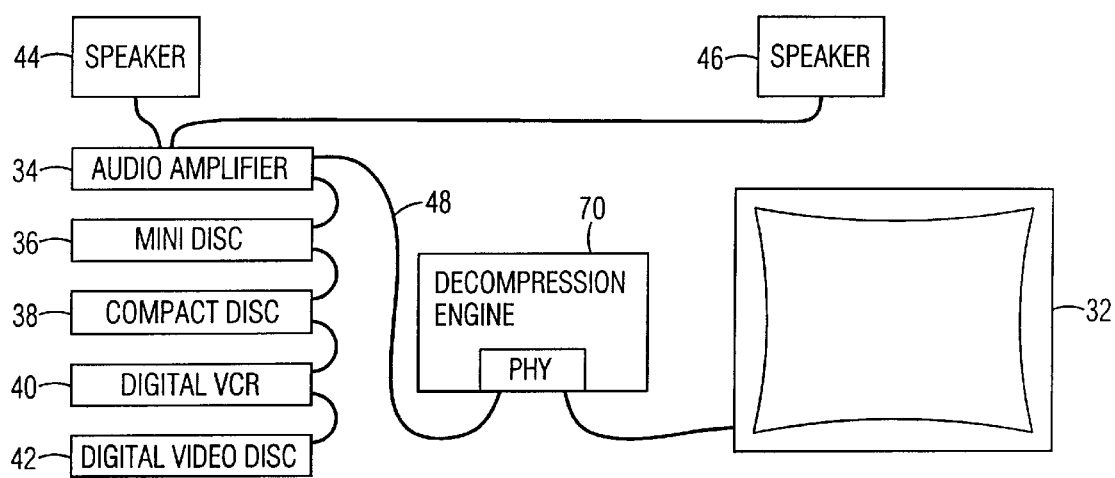
FIG. 5 illustrates a consumer entertainment system including a decompression engine embodied within a separate dedicated device.

In an alternate embodiment of the present invention, as illustrated in FIG. 5, the decompression engine is embodied within a separate dedicated component coupled to the IEEE 1394-1995 serial bus 48. The decompression engine 70 is coupled to the IEEE 1394-1995 serial bus 48. Any compressed MPEG stream of data sent to one or more components coupled to the IEEE 1394-1995 serial bus 48 is first sent to the decompression engine 70 of this alternate embodiment. The decompression engine 70 then decompresses the stream of data and if appropriate, separates the audio and video components within the stream of data. The decompressed and separated video component is then transmitted over a first isochronous channel on the IEEE 1394-1995 serial bus 48 to the television 32 or other appropriate device. The decompressed and separated audio component is transmitted over a second isochronous channel on the IEEE 1394-1995 serial bus 48 to the audio amplifier 34 or other appropriate device. Each corresponding portion of the audio and video components are then played simultaneously by the appropriate devices within the appropriate time period, in order to ensure that a correct correspondence is maintained between the audio and video information being played.

As should be apparent to those skilled in the art, the decompression engine of the present invention can be implemented within any appropriate device, such as the television 32, the audio amplifier 34, the mini disc player and recorder 36, the compact disk player 38, the digital VCR 40 and the digital video disk player 42, as illustrated in FIG. 3, or as a separate component, as illustrated in FIG. 5. The decompression engine of the present invention embodies any appropriate method for decompressing a compressed stream of data and separating the components within the stream of data. While an MPEG stream of data has been used as an example in the discussion above, it should be apparent to those skilled in the art, that the decompression engine could be used to decompress a data stream which has been compressed according to any appropriate format. It also should be apparent that the present invention could be used on an uncompressed stream of data which includes two or more components. In the situation of an uncompressed stream of data, the components are separated without being decompressed and then transmitted isochronously to the appropriate devices.

Figure 1:
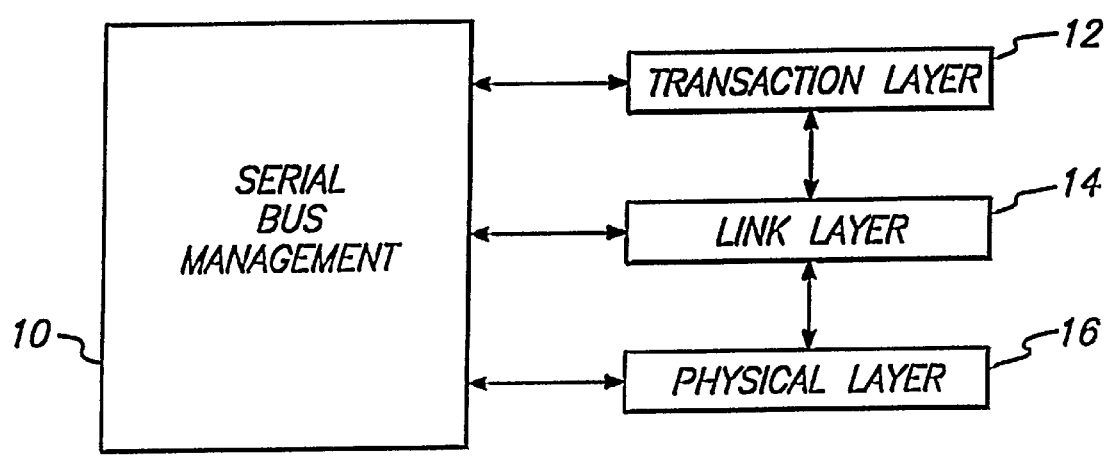
FIG. 1 illustrates the protocol layers defined by the IEEE 1394-1995 standard.
Figure 2:
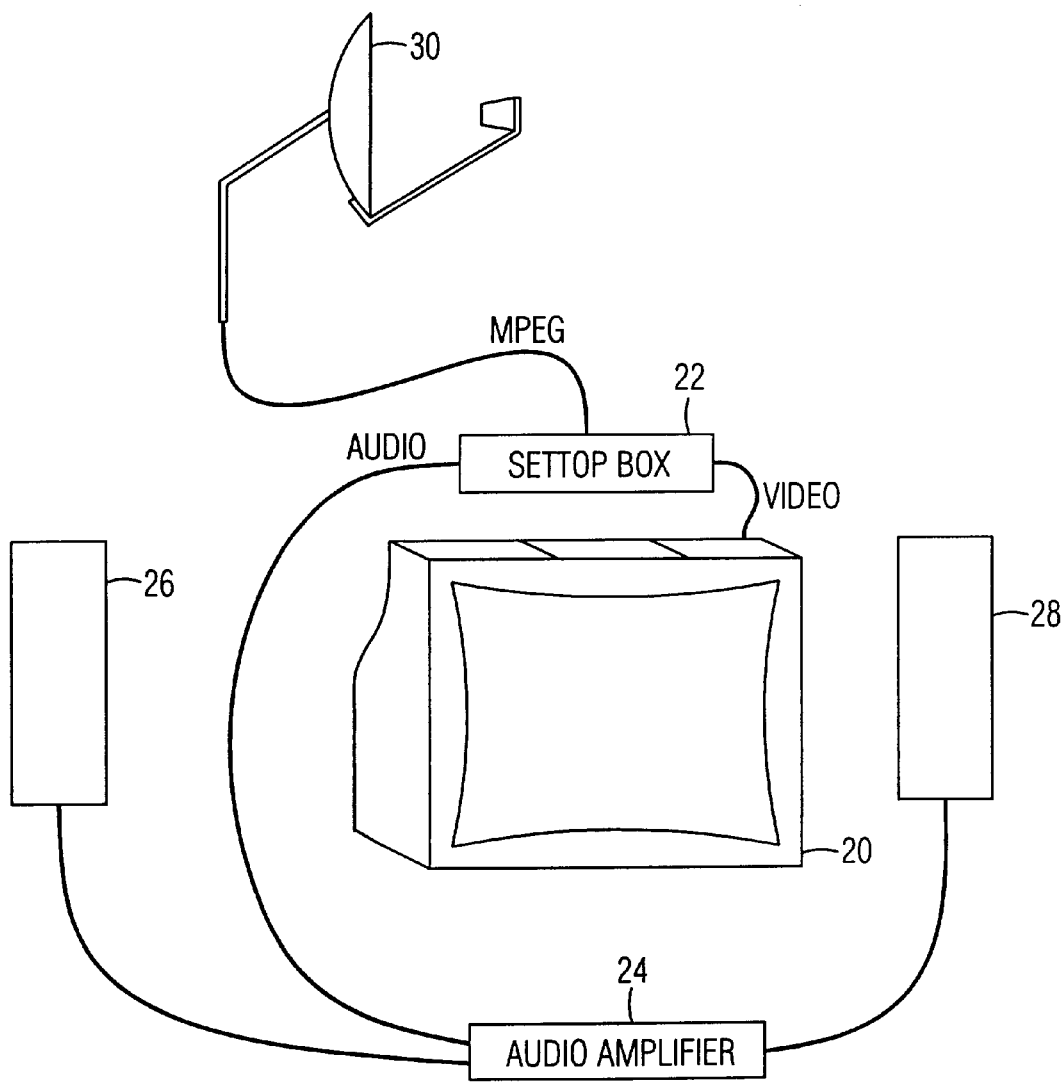
FIG. 2 illustrates a consumer entertainment system of the prior art including a settop box, a television, an audio amplifier and a set of speakers.

The decompression engine of the present invention is advantageous over the settop box 22, illustrated in FIG. 2, because it provides a single interface through which the separate audio and video components are transmitted. In the preferred embodiment, this single interface is an IEEE 1394-1995 interface circuit. As described above, the IEEE 1394-1995 serial bus provides the advantage of a digital interface, allowing the separate audio and video components to be transmitted digitally, without requiring the separate components to first be converted to an analog format before transmission. The separate components are also transmitted isochronously, thereby ensuring that the corresponding audio and video information is played within appropriate time periods in order that the correct correspondence is maintained between the audio and video information being played.

By implementing the decompression engine within the television 32 or as a separate device 70, a general purpose audio component which only understands uncompressed audio data, such as the audio amplifier 34, can be used in an environment, as illustrated in FIGS. 3 and 5, where the only audio information available is compressed and/or embedded in another stream of data. In such a configuration, the audio information is decompressed and separated before it is transmitted to the audio amplifier 34. When the audio information is received by the audio amplifier 34, the audio information is amplified, converted to an analog format and sent to the speakers 44 and 46.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures.

I claim:

1. A decompression engine for decompressing a compressed stream of data including a plurality of components, comprising:

a. an interface circuit configured for coupling to a bus structure for receiving and transmitting data over the bus structure including a combined stream of data having the plurality of components;

b. a decompression circuit coupled to the interface circuit for decompressing the combined stream of data thereby forming a decompressed stream of data; and c. a separating circuit for separating the plurality of components within the decompressed stream of data into separate and decompressed component streams of data, wherein at least one of the separate and decompressed component streams of data is transmitted through the interface circuit over the bus structure to a remote device.

2. The decompression engine as claimed in claim 1 wherein the decompression circuit is included within a local device and further wherein at least one of the separate and decompressed component streams of data is sent to components within the local device.

3. The decompression engine as claimed in claim 2 wherein the compressed stream of data is received in an MPEG format.

4. The decompression engine as claimed in claim 3 wherein the separate and decompressed component streams of data represent audio and video data.

5. The decompression engine as claimed in claim 4 wherein the bus structure is an IEEE 1394-1995 serial bus structure.

6. A television for displaying video information comprising:

a. a display for displaying video information;

b. a display driver coupled to the display for controlling the display and providing the video information to be displayed;

c. an interface circuit configured for coupling to a bus structure for receiving and transmitting data over the bus structure including a combined stream of data having audio and video components; and d. a decompression engine coupled to the interface circuit and to the display driver for decompressing the combined stream of data thereby forming a decompressed stream of data and separating the decompressed stream of data into an audio stream of data and a video stream of data, wherein the audio stream of data is transmitted through the interface circuit and over the bus structure to a remote device and the video stream of data is sent to the display driver to be displayed on the display.

7. The television as claimed in claim 6 wherein the combined stream of data is received in an MPEG format.

8. The television as claimed in claim 6 wherein the bus structure is an IEEE 1394-1995 serial bus structure.

9. The television as claimed in claim 8 wherein the combined stream of data is received on a first isochronous channel.

10. The television as claimed in claim 8 wherein the audio stream of data is transmitted on a second isochronous channel.

11. A home entertainment system comprising:
   a. a plurality of devices;
   b. an IEEE 1394-1995 serial bus structure coupled between the plurality of devices to transmit data between the devices including a combined stream of data having a plurality of components; and
   c. a decompression engine coupled to the bus structure and to the plurality of devices to decompress the combined stream of data, thereby forming a decompressed stream of data, and separate the decompressed stream of data into an audio stream of data and a video stream of data, wherein the audio stream of data is transmitted to one or more of the plurality of devices and the video stream of data is transmitted to one or more of the plurality of devices, the decompression engine including:
      i. an interface circuit coupled to the bus structure to receive and transmit data over the bus structure including the combined stream of data, the audio stream of data and the video stream of data;
      ii. a decompression circuit coupled to the interface circuit to decompress the combined stream of data to form the decompressed stream of data; and
      iii. a separating circuit to separate the plurality of components into the audio stream of data and the video stream of data, wherein at least one of the audio stream of data and the video stream of data is transmitted through the interface circuit over the bus structure to a remote one of the plurality of devices.

12. The home entertainment system as claimed in claim 11 wherein the decompression engine is included within one of the plurality of devices.

13. The home entertainment system as claimed in claim 11 wherein the decompression engine is a stand-alone device.

14. The home entertainment system as claimed in claim 11 wherein the combined stream of data is received by the decompression engine in an MPEG format.

15. The home entertainment system as claimed in claim 11 wherein the plurality of devices include a television and an audio amplifier.

* * * * *